Dec. 1, 1942.  B. F. KREHBIEL ET AL  2,303,884
MACHINE FOR MAKING UNITS OF PLASTIC MATERIAL
Filed Jan. 27, 1940  5 Sheets-Sheet 1

INVENTORS
B. F. KREHBIEL
M. D. GLASS
BY M. Y. Charles
ATTORNEY.

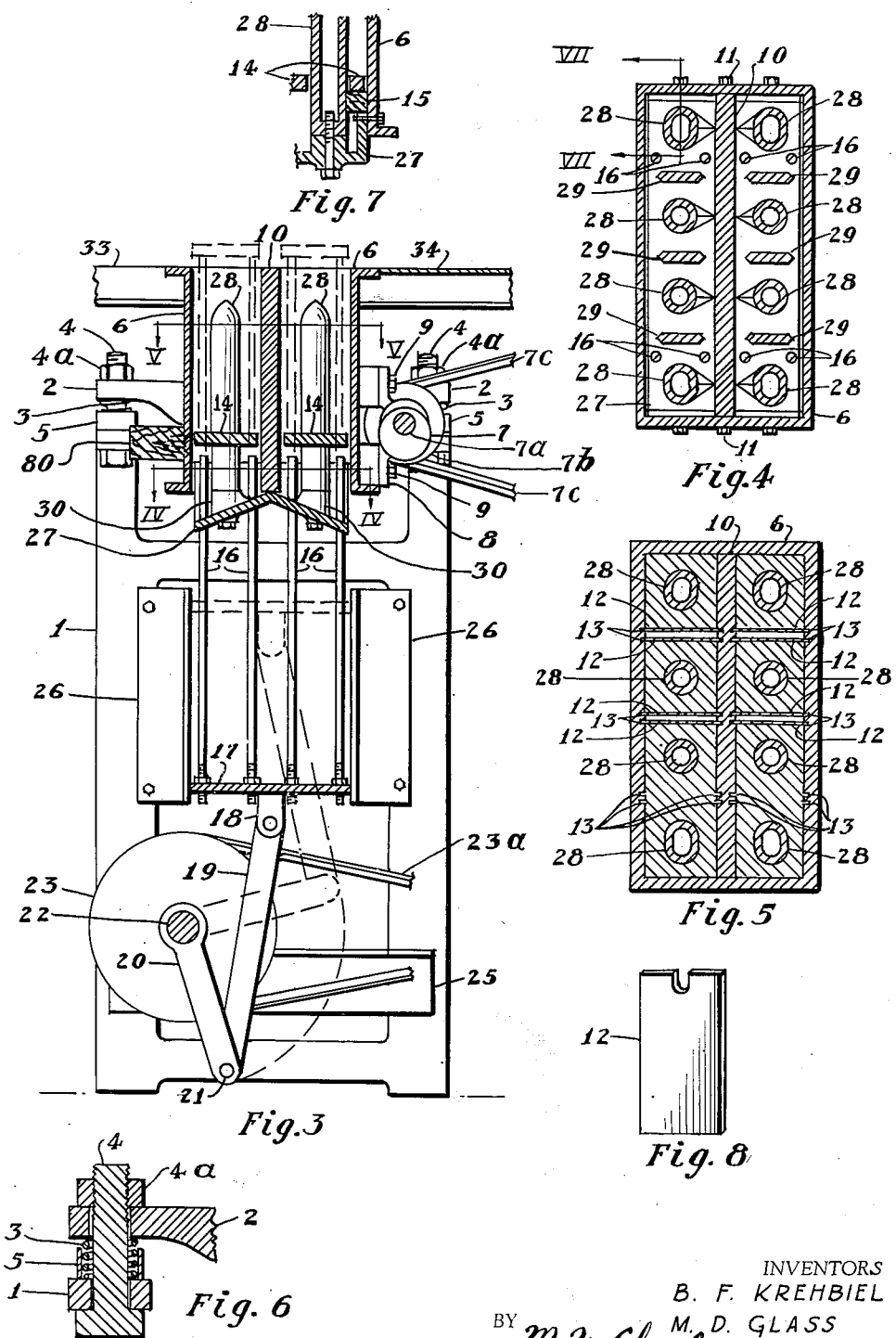

Dec. 1, 1942.  B. F. KREHBIEL ET AL  2,303,884
MACHINE FOR MAKING UNITS OF PLASTIC MATERIAL
Filed Jan. 27, 1940  5 Sheets-Sheet 3
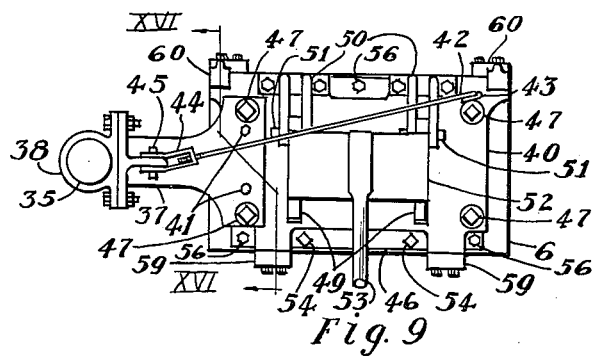
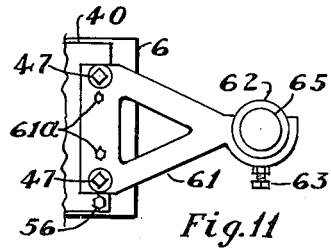
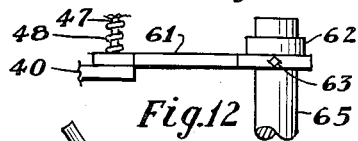
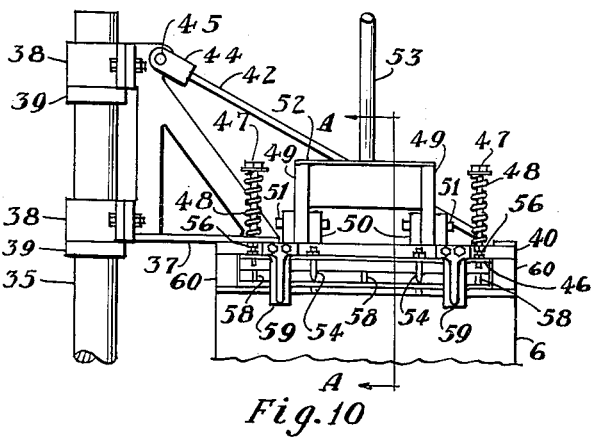
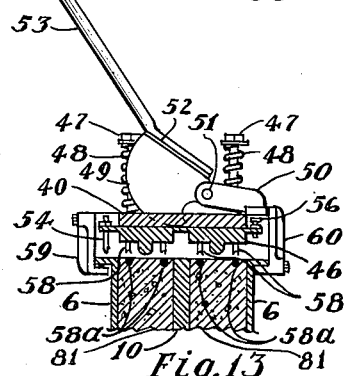
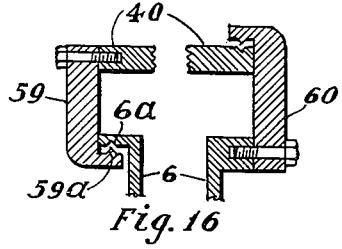
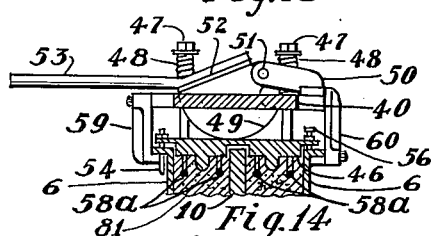
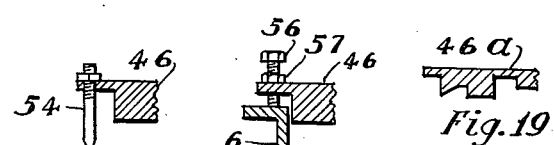
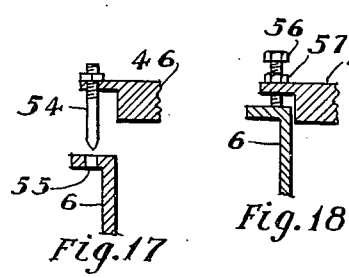
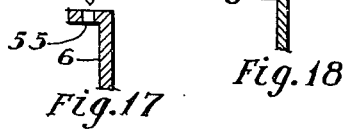
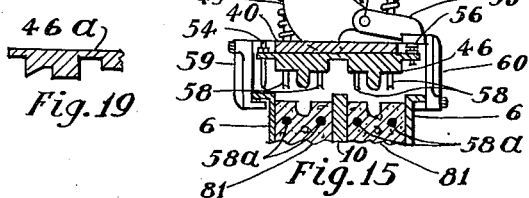
INVENTORS
B. F. KREHBIEL
M. D. GLASS
BY M. Y. Charles
ATTORNEY.

Dec. 1, 1942.   B. F. KREHBIEL ET AL   2,303,884
MACHINE FOR MAKING UNITS OF PLASTIC MATERIAL
Filed Jan. 27, 1940   5 Sheets-Sheet 4
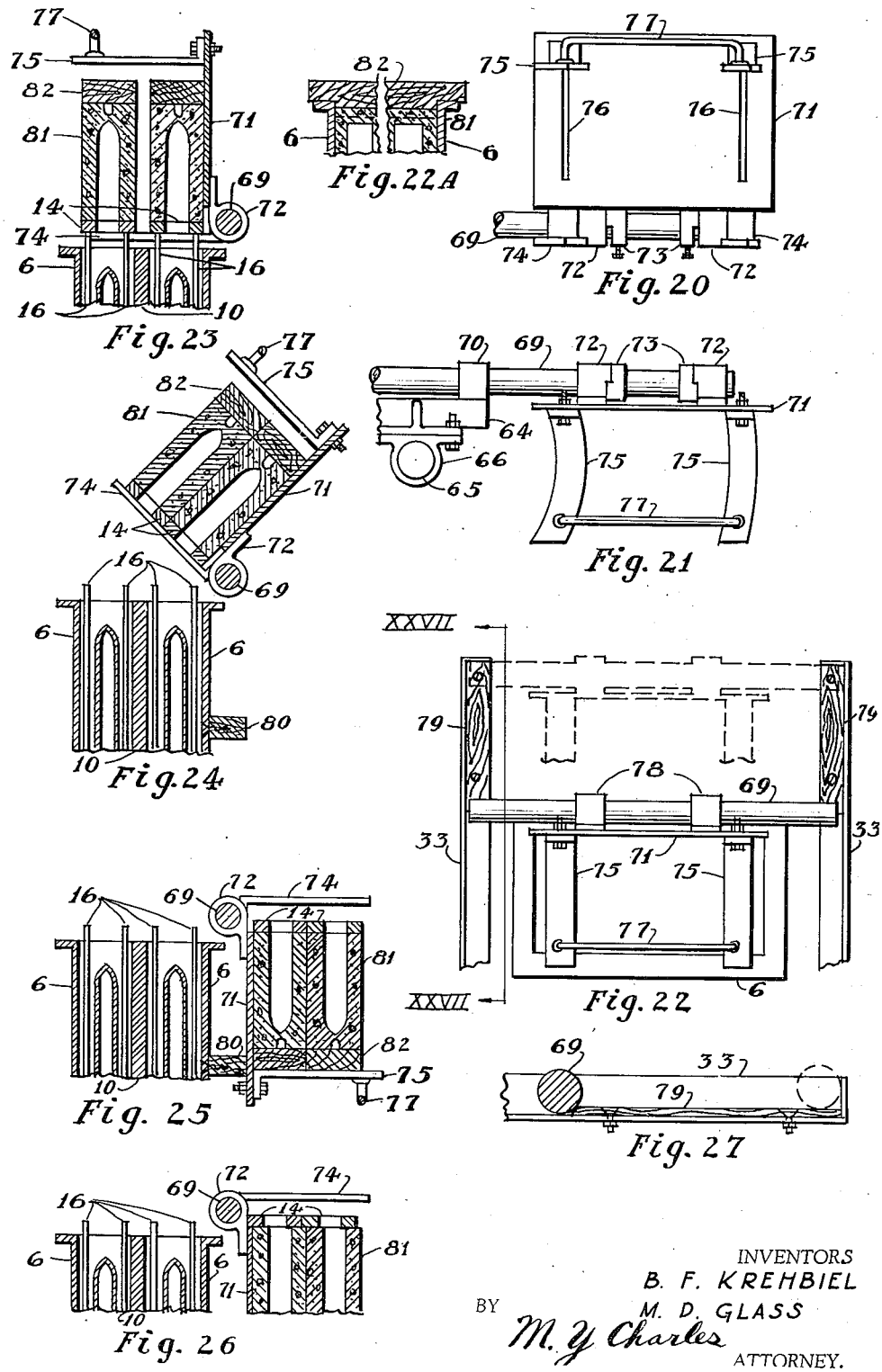
INVENTORS
B. F. KREHBIEL
M. D. GLASS
BY M. Y. Charles
ATTORNEY.

Dec. 1, 1942.  B. F. KREHBIEL ET AL  2,303,884
MACHINE FOR MAKING UNITS OF PLASTIC MATERIAL
Filed Jan. 27, 1940  5 Sheets-Sheet 5
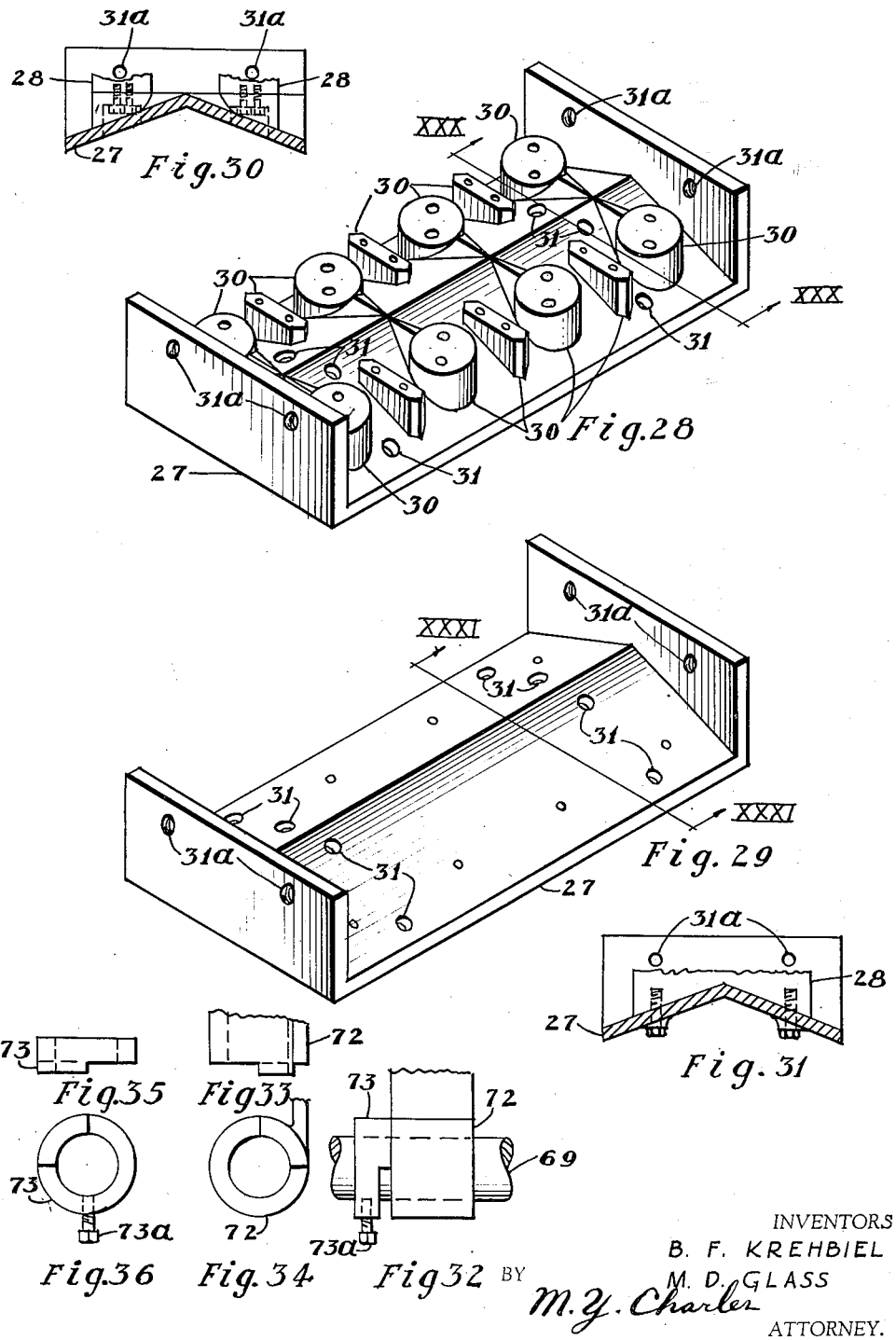
INVENTORS
B. F. KREHBIEL
M. D. GLASS
BY M. Y. Charles
ATTORNEY.

Patented Dec. 1, 1942

2,303,884

UNITED STATES PATENT OFFICE 2,303,884

MACHINE FOR MAKING UNITS OF PLASTIC MATERIAL

Benjamin F. Krehbiel and Mansfield D. Glass, Wichita, Kans.

Application January 27, 1940, Serial No. 315,894

3 Claims. (Cl. 25—41)

Our invention relates to an improvement in a machine for producing a plastic cast unit.

The object of our invention is to facilitate the production of a high quality unit by overcoming some of the manufacturing difficulties encountered by the use of present machinery. What prompted the experimenting and finally the development of our present machine and process is that we have been working for some time on a new unit for building construction but were unable to find a machine or process that would produce these units to our entire satisfaction.

In making this machine we discovered that the principles used in this machine were not only applicable to the particular shape and size of unit which we were trying to produce, but was vital in the production of all shapes and sizes of units produced in and stripped from a mould.

The following are some of the difficulties which had to be overcome. The ways and means of overcoming these difficulties will be described later as we describe the way our machine operates.

The system commonly known as "tamping" did not produce a unit of sufficient density and strength. We therefore turned to the system commonly known as "vibration" which did in a measure overcome some of the difficulties presented by the "tamping" method but still did not produce a unit to our entire satisfaction without certain improvements. The portion of the unit near the top of the mould box was not as dense as the lower part of the unit and the top edges were rough and ragged. The top surface of some of the units which we were attempting to produce were to be formed in shapes other than a single plane.

By experimenting we found that by pressing and vibrating at the same time we were able to produce a unit of uniform density throughout and also eliminate rough and ragged edges. We also discovered that the top surface of the unit as it set in the machine could be formed to any desired shape. It can be readily seen that the shape of the top surface of the unit as it sets in the machine which produces it is determined by the shape of the plate which is pressed down on top of the unit while the machine is vibrating.

Further difficulties were that if the unit was taken away from the machine in the same position in which it was produced that it must be produced on pallets of the same shape as the bottom of the unit and the unit must be left on these pallets until the units have obtained sufficient strength to support themselves.

It is therefore obvious that a sufficient number of these special shaped pallets would have to be had to support all of the units produced during the time intervening between the time the units were produced and the time that the units had obtained sufficient strength to support themselves so that the pallets might be removed and used again.

These special shaped pallets are quite expensive therefore a large investment in pallets would be necessary in order to obtain continuous production.

We therefore used plain pallets to support the units during the hardening period. The use of plain pallets is accomplished by turning the unit over onto these pallets as soon as the units are produced. The method of doing this is described later.

The difficulty of using the system of turning the units over on its side on plain pallets was that hollow units collapsed a short while after they were turned over on their side.

We discovered that by turning the unit over approximately 180 degrees so that the side of the unit which was the top as it was produced in the machine became the bottom of the unit as it was stored during hardening period, that plain pallets could be used to support the units and the vertical position of the cells during this hardening period eliminated the difficulty of the units collapsing while they were still too soft to support themselves across the cells. Inasmuch as plain pallets are less expensive than special pallets, a smaller investment is required in pallets in order to obtain continuous production.

The operation of the machine and the uses of its component parts will be described more fully later.

Now referring to the accompanying drawings,

Fig. 3 is a vertical cross section on line III—III in Fig. 1.

Fig. 4 is a horizontal cross section through the mould box on line IV—IV in Fig. 3.

Fig. 5 is a horizontal cross section through the mould box on line V—V in Fig. 3, with the material from which the unit is produced in place in the mould box.

Fig. 6 is a vertical cross section on line VI—VI in Fig. 1.

Fig. 7 is a vertical cross section on line VII—VII in Fig. 4.

Figure 2:
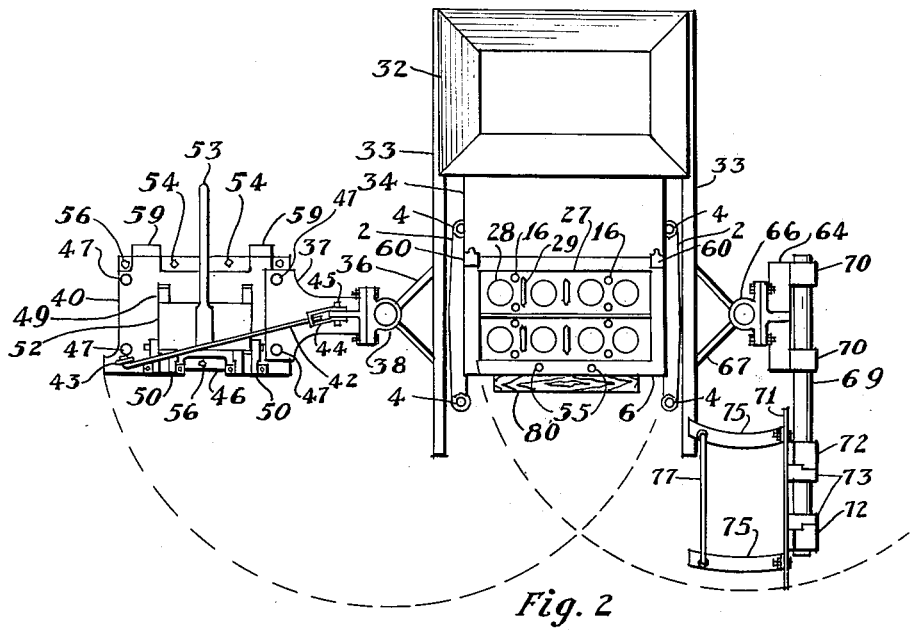
Fig. 2 is a top view of the complete machine.

Fig. 8 is a perspective view of a divider plate.
Fig. 9 is a top view of the pressure head.
Fig. 10 is a front view of the pressure head.
Fig. 11 is a top view of an alternate means for holding the pressure head in position.
Fig. 12 is a front view of Fig. 11.
Fig. 13 is a cross section through the pressure head positioned over a filled mould box.
Fig. 14 is the same as Fig. 13 except the pressure plate is shown in the down position.
Fig. 15 is the same as Fig. 13 except pressure plate is in a raised position after pressure has been applied to the material in the mould box.
Fig. 16 is a broken section on line XVI—XVI in Fig. 9.
Fig. 17 is a guide pin for the pressure plate.
Fig. 18 is a depth gauge for the pressure plate.
Fig. 19 is a section through a pressure plate of a modified shape than shown in the other drawings.
Fig. 20 is a front view of the take off mechanism.
Fig. 21 is a top view of the take off mechanism.
Fig. 22 is a top view of the take off mechanism with an alternate means of attaching it to the machine.
Fig. 22A is a longitudinal section through a pallet resting on top of a pressed unit before the unit is pushed up out of the machine.
Fig. 23 is a cross section through the take off mechanism positioned around the units prior to the revolution of the take off mechanism.
Fig. 24 is the same as Fig. 23 except the take off mechanism is in the process of being turned over.
Fig. 25 is the same as Fig. 23 except the take off mechanism has been turned over.
Fig. 26 is the same as Figure 25 except the stripper plates have been slid back.
Fig. 27 is a section on line XXVII—XXVII of Fig. 22.
Fig. 28 is an isometric view of the plate upon which the cores may be assembled.
Fig. 29 is an isometric view of an alternate plate upon which cores may be assembled.
Fig. 30 is a cross section on line XXX—XXX in Fig. 28.
Fig. 31 is a cross section on line XXXI—XXXI in Fig. 29.
Fig. 32 is a front view of the bearing and stop collar control on the take off mechanism.
Fig. 33 is a top view of the end of the bearing on the take off mechanism.
Fig. 34 is an end view of the bearing shown in Fig. 33.
Fig. 35 is a top view of the stop collar on the take off mechanism.
Fig. 36 is an end view of the stop collar shown by Fig. 35.

Now referring to the component parts of the machine, their purpose and how they operate as shown on the accompanying drawings. The same reference numerals are used for the same component parts throughout the several figures of the drawings.

1 is the frame or legs which support the machine. 2 is the hangers to which the mould box 6 is fastened. These hangers rest on springs 3 which in turn rest on the frame 1, thereby suspending the mould box 6 on the frame 1.

The purpose of the springs 3 is to allow the mould box 6 to vibrate independent from the frame 1 during the first period of vibration.

4 is a bolt having a nut 4A thereon which holds the hangers 2 and the spring 3 in position on the frame 1. 5 is a collar fitted loosely around spring 3 and resting on frame 1. The purpose of this collar 5 is to form a stop for hangers 2 as the spring 3 is compressed when the unit which is being produced in the mould box 6 is being pressed. The space between this collar 5 and the hanger 2 is great enough so that hanger 2 does not touch collar 5 when the mould box is loaded and is vibrating during the first period. Pressure is then applied to the top of the unit which is being produced in the mould box 6. When pressure is applied it is transmitted through the hangers 2 to the springs 3 which compress until the bottom hangers 2 contact collar 5. Collar 5 rests firmly on frame 1 therefore collar 5 acts as a stop preventing any further downward movement of mould box 6 during the second period of vibration, so that pressure may be applied forcibly to the unit 81 which is being produced. It will be observed that collar 5 has nothing to do with the vibrating action.

7 is a vibrating element which comprises an off center weight which is rigidly mounted on a shaft 7a carried in bearings 8 which is rigidly attached to mould box by means of bolts 9. On the shaft 7A is a pulley 7B rigidly mounted thereon and which is driven by a belt 7C.

10 is a longitudinally divided plate held securely to mould box 6 with bolts 11. Although the accompanying drawings show a mould box 6 with only one divider plate 10 it is obvious that a multiplicity of units may be produced at one time by adding other divider plates 10 as required, fastened in the same manner to mould box 6 with other bolts 11, or divider plate 10 may be removed by removing bolts 11 so that one unit is produced at a time. 12 is transverse divider plate which may be aligned into grooves 13 as shown in Fig. 5 where a multiplicity of units are produced throughout the length of mould box 6. It will be observed that the divider plates 12 are arranged in pairs spaced a short distance apart. The object of using them in pairs is two fold. First it facilitates removing divider plates 12 without damage to the units which are being produced because of the space between the pair of divider plates 12. Second the space between may be of a size that would take out the exact width of a mortar joint as would be desirable in producing fractions of units to be used in constructing walls of a building. These divider plates 12 slip into grooves 13 which are vertical throughout the height of the mould box 6 or divider plate 10 and rest on the stripper plate 14. These divider plates 12 strip out of mould box 6 at the same time as the units 81 which are being produced, are stripped out and are replaced as desired each time before the mould box is filled. It is obvious that if desired that grooves similar to 13 may be placed in cores 28 and divider plates 12 shaped accordingly. It is also obvious that the shape of the top of the divider plates 12 must be made to conform with the shape of the top of the unit 81 which is being produced.

14 is a stripper plate fit loosely in mould box 6 and around cores 28. This stripper plate 14 rests on a gauge 15 which in turn is supported by the core assembly plate and stripper rod guide 27. The depth from the top of the mould box 6 to the top of the stripper plate 14 may be varied by changing the height of the gauge 15. This stripper plate 14 forms the bottom of the mould box 6 and serves as a means to push against when the units 81 are being stripped up out of the mould box 6. It is obvious that the shape of the stripper plate 14 must conform to the shape of the bottom of the unit 81. If a different arrangement and shape of cores are desired or the cores are omitted entirely in order to produce a solid unit 81 or any other than one plane is used for the shape of the bottom of the unit 81, the stripper plate 14 must conform. Inasmuch as this fact is obvious, additional drawings were not made to cover variation in shape of stripper plates 14.

16 are rods which push against the bottom of stripper plates 14 when the units 81 are stripped up out of the mould box 6. These rods 16 are fastened to an assembly plate 17. The assembly plate 17 is fastened to arm 19 by means of a clevice or similar device 18. Arm 19 is fastened to arm 20 with bolt or cylindrical pin 21. Arm 20 is fastened securely to shaft 22. As shaft 22 is caused to revolve by driving element 23 mounted on shaft 22, an upward motion is developed as indicated by the dotted lines in Figure 3. This motion is transmitted back to the unit 81 which is pushed up out of the machine by the motion indicated by the dotted lines in Fig. 3. Shaft 22 revolves within bearings 24 secured to support 25. Support 25 is fastened to frame 1. 26 are guides secured to frame 1. 26 serves to guide plate 17 as plate 17 moves up and down. 27 is the plate upon which cores 28 and 29 are assembled. The purpose of cores 28 is to form vertical holes in the unit which is being produced therefore they may be of any size or shape that will allow the unit 81 to be pushed up out of the machine.

Figures 28, 29, 30 and 31 show two different schemes for attaching the cores 28, to plate 27. In Figures 28 and 30 bosses 30 are raised to which cores 28 and 29 are attached by bolts. In Figures 29 and 31, the bosses are omitted and the bottom of the cores 28 are shaped to fit over the plate 27. Cores 28 are attached to plate 27 by bolts as shown in Fig. 31. The bosses 30 as shown in Figures 28 and 30 are optional with the manufacturer of the machine but in either case the cores 28 and 29 are attached to plate 27. The purpose of holes 31 is to guide rods 16 as rods 16 move up or down. Plate 27 is attached solidly to mould box 6 by bolts through holes 31A so that the complete assembly of mould box 6 and cores 28 all vibrate at the same time propelled by one means of vibration.

Plate 27 consists primarily of sloping planes. There is a space between the outer edges of these planes and the lower edge of the mould box 6. These planes are so arranged that any debris which may fall on plate 27 during the production of units manufactured in the machine will be shed out through the space between plate 27 and the mould box 6 as the machine vibrates. This prevents any choking up of the machine on top of plate 27 that would hinder the operation of the machine. 32 is a hopper slidably attached to rails 33. 34 is a plate which prevents the hopper 32 from discharging until it is over the mould box 6.

Now to describe the pressure head as detailed by Figures 9 to 19 inclusive. 35 is a cylindrical post attached to the frame 1 by means of brackets 36. 37 is a bracket rotatably attached to post 35 by bearings 38 supported by collars 39 which are rigidly attached to posts 35. 40 is a plate which supports the rest of the component parts of the pressure head. Plate 40 is so shaped that it allows the moving parts of the pressure head to operate without interference. Plate 40 is attached to bracket 37 by bolts 41. The purpose of rod 42 is to relieve the downward strain on bracket 37 at the point where plate 40 is attached and also to adjust plate 40 to a position parallel to the top of mould box 6. A hook is formed on the lower end of rod 42 which hooks into an eye 43 which is attached firmly to plate 40. The upper end of rod 42 is threaded and screws into clevice 44 which is attached to bracket 37 by means of a pin 45. 46 is a forming plate the purpose of which is to press the top of the unit 81 in order to obtain a uniform density throughout the unit which is being produced and also to form the top of the unit 81 to its desired shape. Forming plate 46 is attached to plate 40 by means of bolts 47 suspended on springs 48 which rest on plate 40. The springs 48 serve as a means to allow the forming plate 46 to move in a downward direction and then lift it back in an upward direction until the top of forming plate 46 rests against the bottom of plate 40.

Forming plate 46 is forced in a downward direction by means of cams 49 rotatably attached to bearings 50 by means of a pin 51. Bearing 50 is solidly fastened to plate 40. 52 is a plate connecting cams 49 together. 53 is a handle rigidly attached to plate 52 to which force is applied causing cams 49 to rotate which in turn force forming plate 46 in a downward direction.

It is obvious that plate 46 could be forced in a downward direction and lifted back in an upward direction by other means than those shown and described. For example the same work might be accomplished by a screw, a rack and pinion, a lever, a hydraulic or pneumatic piston and many other means. Therefore it is not our desire to limit ourselves to the means which we show on the drawings of applying force to plate 46 causing it to move in a downward and upward direction. However we do wish to cover the fact that the forming plate is forced downward and accomplishes the work later described.

54 is a guide pin for forming plate 46. A larger scale detail of this pin is shown by Fig. 17. This pin 54 is cylindrical in shape, threaded at the top end and having a bullet shaped lower end. It is attached to plate 46 by screwing into the plate and locked into place by a nut. Hole 55 is drilled through the top edge of mould box 6 directly under pin 54. As the forming plate 46 moves downwardly, pin 54 enters hole 55. Hole 55 acts as a guide for pin 54 which being solidly attached to plate 46 acts as a guide for plate 46 to position it accurately and cause plate 46 to enter mould box 6 without difficulty.

Set screw 56 is a guage which regulates the distance that forming plate 46 may be forced down into mould box 6. Set screw 56 screws through plate 46 a predetermined distance and is locked in position by a lock nut 57. It will be observed that this set screw is adjustable up and down. As forming plate 46 moves downward the bottom end of set screw 56. Contacts mould box 6 thereby stopping the downward motion of forming plate 46, into the mould box 6.

Pins 58 are means of forcing reinforcing steel 58A into the unit. Pins 58 are attached solidly to forming plate 46. The lower ends of pins 58 are slotted to engage the reinforcing steel 58A in such a manner that the reinforcing steel 58A does not slip or roll out from under pins 58 as the steel is being forced into unit 81 by the downward motion of plate 46. The pins 58 may be attached to the reinforcing steel 58A in which case pins 58 are not a part of the machine but a part of the reinforcing steel 58A. In that case they remain in the unit which is being produced. However the downward motion of plate 46 still forces the reinforcing steel into the unit 81. The action of the pressing mechanism is illustrated by Figure 13 which shows the pressure head in position over a full mould box 6. Figure 14 which shows the forming plate forced down and Fig. 15 which shows it released and the top of the unit 81 formed and pressed and the reinforcing steel 58A in place.

59 is a clamp which positions the pressing mechanism over the mould box 6 and clamps plate 40 and mould box 6 together. Clamp 59 is fastened solidly to plate 40. The lower end of clamp 59 is turned toward mould box 6 at approximately 90 degrees or parallel to the lip on mould box 6. On the upper side of this lower angle of clamp 59 is a raised button 59A. Directly above this button and in the underside of the lip on mould box 6 is a depression 6A into which the button 59A may fit. This button and depression engage prevent any slipping. As the pressing mechanism is swung over the mould box 6 the vertical portion of clamp 59 contacts the edge of the lip on mould box 6, thereby stopping plate 40 in proper alignment with mould box 6. As the forming plate 46 contacts the material in the mould box 6 and pressure is applied in a downward direction transmitted by forming plate 46 the springs 3 upon which the mould box is suspended are compressed. As the mould box 6 travels downward the under side of the lip on mould box engage the angle on clamp 59 and stop the downward motion of the mould box 6. There is also a tendency for plate 40 to spring upward as the downward pressure on top of the unit 81 which is being produced is exerted. It will be observed that the clamp 59 prevents any further downward movement of mould box 6 or any further upward movement of plate 40 as soon as the angle on the lower end of clamp 59, contacts the under side of the lip on mould box 6. As soon as the pressure is released the springs 3 move mould box 6 upward, disengaging the clamp 59 from mould box 6 and the pressing mechanism may be swung back out of the way. Clamps 59 are toward the front of the machine. Toward the back of the machine are clamps 60 which are similar to clamps 59 and act in the same manner except clamps 60 are fastened to mould box 6 and engage plate 40. Clamps 60 set upside down in relation to clamps 59. It is understood that collar 5 is not necessary to be used when clamps 59 and 60 are employed.

Clamp 61 is an alternate arrangement used when clamps 59 and 60 are not used and post 65 is available due to a different method of positioning the take off mechanism. Clamp 61 is rigidly attached to plate 40 by means of bolts 61A or any other suitable means and engages partly around post 65. Set screw 63 is screwed through the hook part of clamp 61 and held in place by a lock nut. The purpose of set screw 63 is to contact post 65 and thereby facilitates minor adjustments in order to position plate 40 parallel to and directly over mould box 6. Collar 62 is rigidly attached to post 65 is to halt the upward movement of clamp 61 and plate 40 as pressure is applied to the top of the units 81. As previously described, collar 5 halts the downward movement of the mould box 6.

Now to describe the take off. 64 is a bracket fastened rotatively to post 65 by bearing 66. Post 65 is held in position by brackets 67 attached to frame 1. Bearings 66 are prevented from slipping down past 64 by collars 68 fastened securely to post 65. Shaft 69 is fastened securely to bracket 64 through hangers 70. Plate 71 is fastened securely to bearings 72 which rotate about shaft 69. Bearings 72 are prevented from slipping in a direction parallel to shaft 69 by collars 73 which are fastened securely to shaft 69 by a set screw 73A.

Figures 32 and 36, inclusive, are larger scale details of bearing 72 and collar 73. On the side of bearing 72 next to collar 73 is a portion constituting about one fourth of the circle projects beyond the rest of the end of the bearing 72. On the side of collar 73 next to bearing 72, a portion constituting about one fourth of the circle projects beyond the rest of the end of collar 73. These projections on bearings 72 and collars 73 just described form shoulders which contact each other. As collar 73 is fastened to shaft 69 and bearing 72 rotates about shaft 69 the projection on 72 and 73 contact, thereby limiting the rotation 72 about 69 to approximately 180 degrees. It is obvious that any number of degrees of rotation less than 360 degrees can be obtained by a similar arrangement of shoulders, as the degrees of rotation is determined by the proportional part of the circle that the projections occupy or the adjustment of the position of the projection on collar 73 in reference to bearing 72. In the case of the take off on our machine the rotation is limited to approximately 180 degrees.

Attached to plate 71 are fingers or arms 74 and 75. The ends of these fingers 74 and 75, next to plate 71 turn up at 90 degrees thereby forming a surface to contact plate 71 and allowing these fingers 74 and 75 to be attached to plate 71 by means of bolts. The shape of 74 and 75 are similar.

Fingers 74 are positioned so that there is a space between the horizontal portion of the fingers 74 and the edge of plate 71.

There are slots 76 in plate 71 for the bolts which attach fingers 75 to the plate 71 to allow for adjustment up and down of fingers 75 on plate 71. The purpose of this adjustment is to facilitate the handling of any height of unit 81 which can be produced in mould box 6.

77 is a handle attached to fingers 75 as a means of handling the take off as it is turned over. In Figures 20 and 21 the fingers 74 and 75 are curved to radii the center of which is the center of post 65. This is because the take off mechanism revolves about post 65 when the take off is being positioned around the units 81 after they have been pushed up out of the mould box 6.

Figures 22 and 27 illustrate an alternate means of positioning the take off mechanism around the unit 81. The only difference beteween the two arrangements being that plate 71 is fastened securely to shaft 69 by hangers 78 and that shaft 69 slides on rails 33 to position the take off around the units and that shaft 69 rolls on rails 33 as the take off is being turned over. When the arrangement shown in Fig. 22 is used there is a tendency for the take off to revolve more than 180 degrees therefore an offset strip 79 is fastened to rails 33. After the take off has been turned over plate 71 rests against bumper 80 and shaft 69 rests against offset strip 79 thereby preventing any further rotation or slipping of shaft 69 on rail 33.

The object of showing two different arrangements for positioning the take off around the units is that in case of a small machine, the arrangement shown in Fig. 20 and Fig. 21 is more convenient. In case of a large machine excess strain might be put on post 65. In order to overcome this difficulty the attachments to post 65 and also post 65 would be increased in size until they would make the take off cumbersome to handle. Therefore in case of a larger machine the arrangement shown by Figures 22 and 27 would be more convenient. The following description of the working of the take off as it turns over is identical in either case. After the units 81 resting on plates 14 have been pushed up out of the machine by rods 16 and plate 14 is resting on top of rods 16 the take off is positioned around the units 81 as illustrated by Fig. 23. Note that there is a space equal to the thickness of the divider plate 10 between the units 81.

As the take off is tilted back fingers 74 pick up the units 81 and the units 81 slide together as illustrated by Fig. 24. As the revolution of the take off continues, the units 81 slide on plate 71 until the pallets 82 rest on fingers 75 and the bottom of the stripper plates 14 as they are now positioned in line with the top of plate 71 as illustrated by Fig. 25.

Because the units 81 have been produced on stripper plates 14, there is enough adhesion between the units 81 and plates 14 to prevent plates 14 from being lifted up off the units without damaging the units, therefore stripper plates 14 are slipped as illustrated in Fig. 26 to break the adhesion. Observe that the edge of plate 71 is even with the unit 81 so that protects the edge of the units 81 from damage as plates 14 are being slipped over plate 71, also the thickness of plate 71 is great enough to allow stripper plates 14 to be slipped far enough to break down the adhesion so that stripper plates may be picked up off the units 81.

Fig. 22A illustrates an off set in the end of the pallets 82 which facilitates placing them over the units 81 while the units 81 are still in mould box 6 and ready to be pushed out. The pallets 82 are approximately the same width of the units 81 but longer. Therefore ends of the pallets 82 are notched back until the side of pallets 82, which is next to the unit 81 is approximately the same length of the unit 81 or the opening in the top of the mould box 6. Because the tops of the units 81 have been pressed down below the top of the mould box 6 the pallets 82 drop down into the space as much as they are notched on the ends. Because they drop down into this space, the pallets 82 are aligned perfectly with the units 81 easily.

Now to describe briefly the production of a plastic cast unit 81 in the machine. While hopper 32 is back of the mould box 6 and resting above plate 34, as shown by Fig. 2, the hopper 32 is filled with the mix from which the units 81 are to be produced. Inasmuch as the hopper 32 consists of four sides and has no bottom to support the mix, the mix is encased by the four sides of mould box 52 and is supported by plate 34. The hopper 32 has a capacity great enough to hold more mix than is required to completely fill the mould box 6.

Next the hopper 32, being previously filled with mix from which the units 81 are to be produced is pulled over the mould box 6 and the first period of vibration is started. This period of vibration of mould box 6 serves to shake the mix out of the hopper 32 so that it will fall down into mould box 6 and also compact the mix after it has been thus deposited in mould box 6. This first period of vibration is continued until mould box 6 is completely filled with all of the material that it will take readily. The vibration is then stopped. This vibration having been accomplished by causing the off center weight 7 to revolve rapidly. The weight 7 being solidly attached to shaft 7A which in turn is attached to mould box 6 through means of bearing 8 which are held tightly to mould 6 by bolts 9. Mounted on this same shaft 7A is a pulley 7B which is driven by belt 7C, belt 7C being driven by a means of power not shown in the drawings. Inasmuch as plate 27, cores 28 and 29, divider plate 10 and mould mox 6 are rigidly fastened together and stripper plates 14 are supported as shown by Figure 7, the vibration set up by the rotation of off center weight 7 is transmitted to all parts just mentioned.

As soon as the first period of vibration is stopped, hopper 32 is pushed back out of the way to approximately the position shown by Figure 2. As the hopper 32 is pushed back it serves as a strike off, carrying all excess mix back inside of the hopper 32 and leaves the mould box 6 approximately level full.

Figure 1:
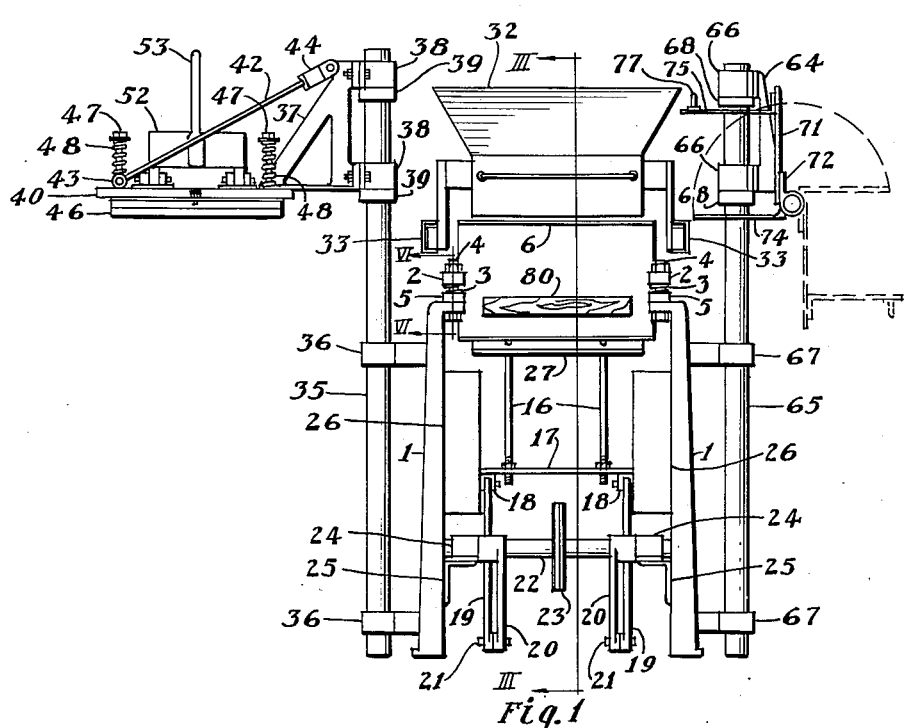
Fig. 1 is a front view of the complete machine.

Next the pressing mechanism shown to the left in Figures 1 and 2 and more clearly illustrated by Figures 9 to 19, inclusive, is swung around to a position over the mould box 6. The second period of vibration is then started and forming plate 46 is forced downward by cam 49 from the position shown in Figure 13 to the position shown in Fig. 14, thereby pressing and forming the top of units 81 at the same time. This pressing while vibrating serves to compact the mix more thoroughly especially in the upper part of the unit 81 thereby producing a dense unit throughout. We have also discovered by actual production that if the top of the unit is to be formed to any desired shape in a satisfactory manner that this pressing of a forming plate 46 into the mix must be done simultaneously with vibration. If it is desired to reinforce the unit 81, reinforcing rods 58A are placed on top of the mix and directly under pins 58 as shown in Fig. 13. As forming plate 46 to which fingers 58 are attached is being forced downward from the position shown in Fig. 13 to the position shown in Fig. 14, fingers 58 contact reinforcing rods 58A and force these rods 58A down into units 81 to the position shown in Fig. 14. We have discovered that if the reinforcing rods 58A are to be forced into the units 81 and a satisfactory bond between the reinforcing rods 58A and the mix from which the units are produced is to be obtained that the rods 58A must be placed while vibration is in progress.

As soon as the unit 81 has been pressed, the top has been formed and the reinforcing steel, if any is desired, has been placed, the second period of vibration is stopped, the pressure released and the forming plate lifted back up by springs 48 or other means to the position shown in Fig. 15, leaving the top of the unit formed to any desired shape, also as shown in Fig. 15.

It will be noted that the pressing mechanism is held in position over the mould box 6 by clamps 59 and 60. It will also be noted that the clamps keep the pressing mechanism and the mould box 6 from spreading away from each other any further than desired, while the pressing is being done. Also note that guide pin 54 which is attached to plate 46 enters hole 55 as the forming plate 46 is being forced down, therefore pin 54 serves to guide plate 46 into mould box 6.

It will also be observed that set screw 56 contacts the top of mould box 6 as plate 46 is being forced downward thereby forming a definite stop and gauging the distance that plate 46 enters into mould box 6, as shown in Figures 13, 14 and 15.

After the forming and pressing of the top of the units has been accomplished, the vibration stopped, and the plate 46 lifted back up to the position shown by Fig. 15, the pressing mechanism is swung back out of the way to approximately the position shown by Figures 1 and 2.

Next pallets 82 are placed over the units 81 as shown by Fig. 22A. Units 81 are then pushed up out of the machine by rods 16 pushing against the stripper plates 14. This pushing up is accomplished thus. 23a is a means of transmitting power from an arrangement of speed reducers, motor and brakes not shown on the accompanying drawings to a pulley or sprocket 23 shown on Fig. 3, causing pulley or sprocket 23 to revolve. Pulley or sprocket 23 is rigidly mounted on shaft 22, on which crank 20 is also rigidly mounted. Crank 20 is attached to arm 19 by pin 21 which allows arm 19 to rotate about pin 21. Arm 19 is attached to plate 17 by clevice 18 and rods 16 are also solidly attached to plate 17. Therefore as shaft 22 is caused to revolve, the pushout mechanism moves from the position shown by solid lines in Fig. 3 to a position shown by dotted lines in Fig. 3. On a small machine where it is desirable to operate the push out mechanism manually instead of by motor or engine power, a long lever is attached to shaft 22 instead of pulley or sprocket 23. The lever is not shown on the accompanying drawings because means which cause the shaft to revolve, either manual or other power depends on the size of the units which are to be produced and the desires of the user of the machine.

After the units 81 are pushed up out of the mould box 6, the take off mechanism is positioned around the units 81 as shown by Fig. 23.

Observe that where two or more units are produced at one time that the units 81 are spaced apart the same distance as the thickness of the divider plates 10, also shown by Fig. 23. Now as the take off mechanism is revolved about shaft 69, fingers 74 pick up the stripper plate 14 and units 81, and the units 81 slide together as shown by Fig. 24, plates 14 sliding on arms 74. As the take off mechanism revolves further the units 81 slide down on plate 71 until pallets 82 rest on fingers 75, as shown by Fig. 25. Observe that fingers 75 are so placed that the edge of plates 14 are in line with the edge of plate 71 as shown by Figure 25. Also note that the take off mechanism has revolved approximately 180 degrees.

Because units 81 have been produced on top of stripper plates 14 there is an adhesion between the units 81 and the stripper plate 14. In order to break this adhesion, stripper plates are forced back to a position shown in Fig. 26. The edge of plate 71 serves to protect the edge of the units 81 as the stripper plates are being pushed back.

Now that the adhesion between stripper plates 14 and units 81 has been broken, plates 14 may be readily picked up off of the units 81.

The push out mechanism is lowered back down to the position shown by full lines in Fig. 3, the stripper plates 14 placed back in mould box 6 and the units 81 thus produced and stripped are taken away, the take off mechanism is swung back out of the way as shown by Figs. 1 and 2.

The entire cycle of operations is then repeated as often as it is desired to produce additional units.

Now having fully described my invention, what we claim as new is:

1. A machine for making units of plastic material, said machine having a form box with stripper plates supported therein, said box having a bottom rigidly attached thereto, said bottom comprising a pair of inclined planes, said plates, meeting at a point intermediate the walls of said box and sloping downwardly in opposite directions to points below the bottom edge of the mould box.

2. A machine for making units of plastic material, said machine having a mould box thereon and a pressure head for said mould box, said pressure head being swingably supported on said machine so that the pressure head may be swung in and out of position over said mould box, and means carried on one side of said mould box for engaging said pressure head when the head is swung into position over said mould box and similar means on said pressure head for engaging the other side of said mould box when said pressure head is swung into position over said mould box, both of said engaging means functioning to limit the spacing of said pressure head above said mould box as and for the purpose described.

3. A machine for making units of plastic material; said machine having a form therein in which the bottom thereof is composed of elevatable and removable stripper plates, and means attached to said form for vibrating the form, and a pressure head for said form, and means as a part of said pressure head for applying pressure to the contents of said mould during the operation of the vibrating means vibrating said form, said means for applying pressure comprising a forming plate yieldably suspended above the form and below the other members of the pressure head, and means carried on the pressure head and engaging the forming plate for forcing the forming plate downwardly into the form for the purpose described, said forming plate having elements thereon for engaging reinforcing elements and forcing said reinforcing elements into the plastic material in the said form upon the downward movement of said forming plate.

BENJAMIN F. KREHBIEL.
MANSFIELD D. GLASS.